United States Patent
Kimura

(10) Patent No.: US 8,030,600 B2
(45) Date of Patent: Oct. 4, 2011

(54) METHOD OF MANUFACTURING A HYDROGEN SEPARATION SUBSTRATE

(75) Inventor: Kenji Kimura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1056 days.

(21) Appl. No.: 11/579,115

(22) PCT Filed: Aug. 15, 2005

(86) PCT No.: PCT/JP2005/015176
§ 371 (c)(1),
(2), (4) Date: Oct. 31, 2006

(87) PCT Pub. No.: WO2006/019168
PCT Pub. Date: Feb. 23, 2006

(65) Prior Publication Data
US 2007/0215604 A1  Sep. 20, 2007

(30) Foreign Application Priority Data
Aug. 18, 2004  (JP) ................................. 2004-237991

(51) Int. Cl.
*B23K 13/01*  (2006.01)
*B01D 59/12*  (2006.01)
*B01D 53/22*  (2006.01)
*B03C 1/00*  (2006.01)
(52) U.S. Cl. .............. 219/615; 95/55; 95/56; 96/1; 96/4
(58) Field of Classification Search ................... 219/615; 96/11, 4; 95/55, 56; 73/23.22
See application file for complete search history.

(56) References Cited

U.S. PATENT DOCUMENTS

| 3,505,180 | A |  | 4/1970 | Brogden |  |
|---|---|---|---|---|---|
| 5,393,325 | A |  | 2/1995 | Edlund |  |
| 5,734,092 | A |  | 3/1998 | Wang et al. |  |
| 5,738,708 | A | * | 4/1998 | Peachey et al. | 95/56 |
| 6,541,676 | B1 | * | 4/2003 | Franz et al. | 585/250 |
| 7,001,446 | B2 | * | 2/2006 | Roark et al. | 95/56 |
| 2002/0011152 | A1 | * | 1/2002 | Oku et al. | 96/4 |
| 2003/0213365 | A1 | * | 11/2003 | Jantsch et al. | 96/11 |
| 2004/0003720 | A1 | * | 1/2004 | Beisswenger et al. | 96/11 |
| 2004/0245191 | A1 |  | 12/2004 | Yagi et al. |  |
| 2005/0076779 | A1 |  | 4/2005 | Saijo et al. |  |
| 2005/0136317 | A1 | * | 6/2005 | Ferguson | 429/38 |

FOREIGN PATENT DOCUMENTS

| EP | 1 433 521 A1 | 6/2004 |
|---|---|---|
| JP | A 5-299105 | 11/1993 |
| JP | A 7-185277 | 7/1995 |
| JP | A 2003-95617 | 4/2003 |
| JP | A 2003-118027 | 4/2003 |
| WO | WO 2004/011130 A1 | 2/2004 |

* cited by examiner

*Primary Examiner* — Henry Yuen
*Assistant Examiner* — Hung D Nguyen
(74) *Attorney, Agent, or Firm* — Oliff & Berridge, PLC

(57) ABSTRACT

The hydrogen permeable substrate includes a copper plate, a stainless steel plate, an insulating member, and hydrogen permeable metal. The hydrogen permeable substrate is formed by locating the insulating member between the stainless steel plate and a combined member formed by embedding the hydrogen permeable metal in through-holes made in the copper plate; subjecting the joining face of each component for joining to other components to irradiation with argon ions, to remove the oxide film thereon and activate the surface; and stacking and rolling the components. By so doing, they may be joined at low temperature and low pressure. Once joined, by cutting the hydrogen permeable metal into individual pieces along cut lines, a plurality of hydrogen permeable substrates may be manufactured all at once.

7 Claims, 6 Drawing Sheets

METHOD OF MANUFACTURING A HYDROGEN SEPARATION SUBSTRATE

TECHNICAL FIELD

The present invention relates to a hydrogen permeable substrate for extracting hydrogen from hydrogen-containing gases containing hydrogen.

BACKGROUND ART

In recent years, fuel cells that generate electricity by means of an electrochemical reaction of hydrogen and air have attracted attention as a source of energy. A fuel cell produces electromotive force by means of an electrochemical reaction of hydrogen and air. Hydrogen to be supplied to a fuel cell is obtained, for example, by using a hydrogen separation unit to separate hydrogen from reformed gases derived by reforming a hydrocarbon feedstock.

Known hydrogen separation units include, for example, devices that utilize hydrogen permeable metal having the quality of selectively passing hydrogen, such as palladium or palladium alloy. With such a device, when reformed gases are supplied to a first side of the hydrogen-separating metal, hydrogen is extracted at the other side. Conventional hydrogen separation units are fabricated, for example, by initially fabricating a hydrogen permeable substrate that formed palladium coating on vanadium (which is also a hydrogen-separating metal), then stacking various parts such as flow channel plates and a top panel on the hydrogen permeable substrate and joining them by means of diffusion bonding, laser bonding, or other joining process.

DISCLOSURE OF THE INVENTION

A drawback of the prior art, however, is that warping of the hydrogen permeable substrate due to the effects of heat produced during bonding may cause the composition of the hydrogen permeable metal to change, so that separating ability declines. An additional problem is that besides the hydrogen permeable substrate itself, the flow channel plates and the like may become deformed by heat, resulting in diminished assembly performance.

With the foregoing in view, it is an object of the present invention to provide a method of manufacturing a hydrogen permeable substrate at low temperature.

In order to address such problems at least in part, the invention has the constitution hereinbelow. Specifically, it resides in a for manufacturing a hydrogen permeable substrate, comprising: forming a through-hole in a first substrate; forming a combined member by embedding a hydrogen permeable metal in the through-hole; and joining the combined member with a second substrate by means of a cladding process.

According to the method of manufacturing a hydrogen separation of the present invention, hydrogen permeable substrates may be manufactured at low temperature and low pressure, so that warping due to heat may be restrained. Accordingly, change in composition of the hydrogen permeable metal may be restrained, and drop in capabilities lessened. Additionally, deformation of the hydrogen permeable metal and the substrate joined with the hydrogen permeable metal may be prevented so that diminished assembly performance may be restrained. By employing the constitution of the present invention, during fabrication, hydrogen permeable substrates may be manufactured while reinforcing the hydrogen-separating metal.

These and other objects, features, aspects, and advantages of the present invention will become more apparent from the following detailed description of the preferred embodiments with the accompanying drawings.

BEST MODE FOR IMPLEMENTING THE INVENTION

The mode for carrying out the invention will be described hereinbelow on the basis of a certain preferred embodiment.

A. Embodiment

Figure 1:
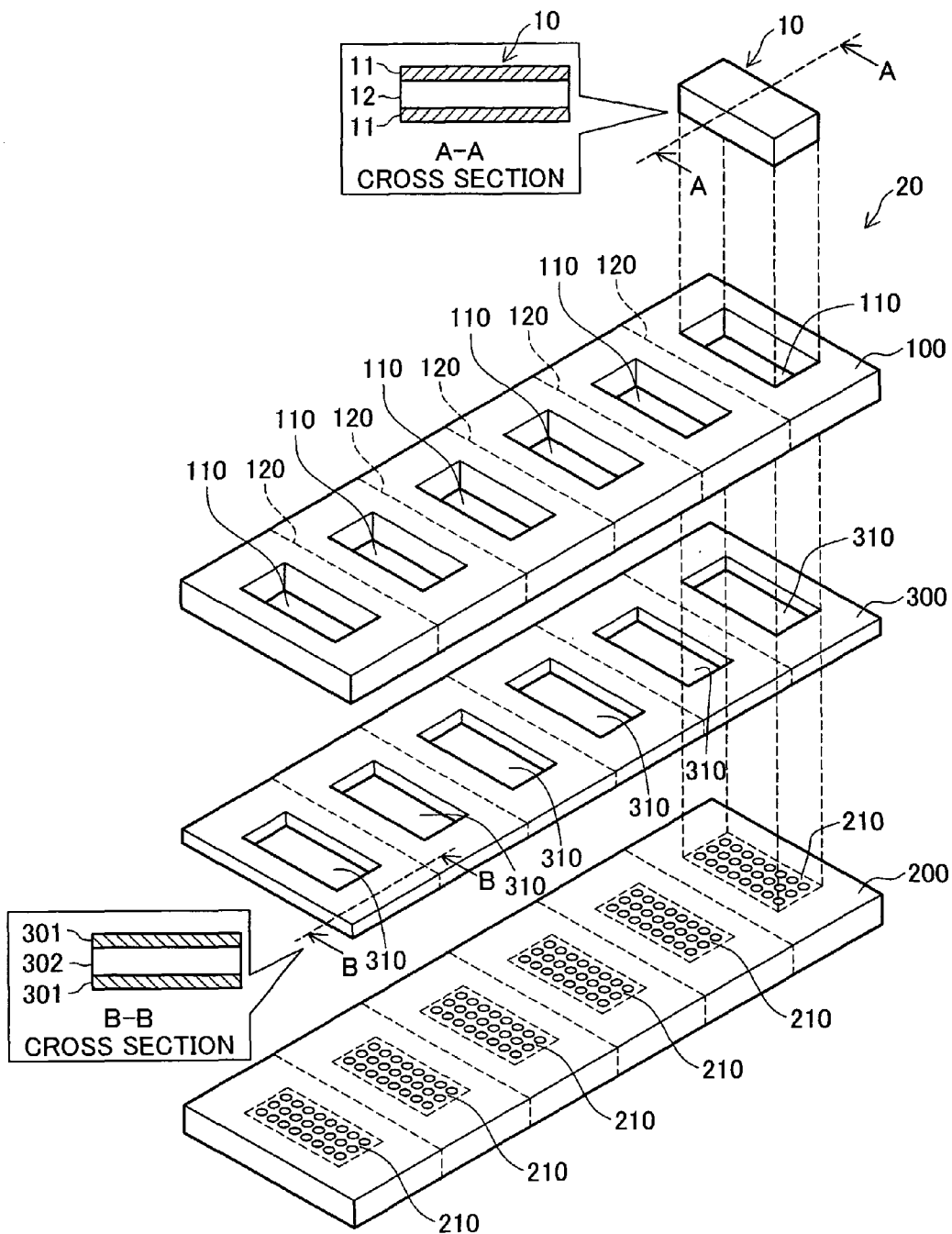
FIG. 1 is an exploded perspective view depicting the general arrangement of the hydrogen permeable substrate in embodiment.

A1. General Arrangement of Hydrogen Permeable Substrate:

FIG. 1 is an exploded perspective view depicting the general arrangement of the hydrogen permeable substrate in the embodiment. The hydrogen permeable substrate 20 of the Embodiment is composed of a copper plate 100, a stainless steel plate 200, an insulating member 300, and a hydrogen permeable metal 10. Also shown in the drawing is a sectional view of the hydrogen permeable metal 10 taken along line A-A.

The hydrogen permeable metal 10 consists of vanadium layer 12 whose surfaces are coated with palladium layer 11. Instead of vanadium, the vanadium layer 12 might be composed of niobium, tantalum, or other Group V metal or Group V metal alloy. Instead of palladium, the palladium layer 11 might be coated with palladium alloy or other metal with hydrogen permeability. The palladium coating may be formed by means of chemical vapor deposition (CVD), physical vapor deposition (PVD), or the like.

Typically, the Group V metals and Group V metal alloys are have much higher selective permeability to hydrogen than does palladium, but since the Group V metals and Group V metal alloys readily oxidize, the Group V metals and Group V metal alloys have the characteristic of losing permeability to hydrogen due to formation of an oxide film. In this embodiment, by coating the surfaces of the vanadium layer 12 with palladium layer 11, it is possible to inhibit formation of an oxide film, while ensuring high permeability to hydrogen.

The copper plate 100 has formed therein six through-holes 110 of the same shape as the hydrogen permeable metal 10. The stainless steel plate 200 has a plurality of holes 210 formed at locations corresponding to those of the through-holes 110 when superposed onto the copper plate 100.

The insulating member 300 has through-holes 310 of the same shape as the through-holes 110, formed at locations corresponding to those of the through-holes 110 when the insulating member 300 is superposed onto the copper plate 100. Also shown in the drawing is a sectional view of the insulating member 300 taken along line B-B. The insulating member 300 has a metal layer 301 disposed on both sides of an insulating material 302. The insulating material 302 is composed of ceramic or resin having insulating properties. The metal layers 301 are composed of nickel. In the embodiment, for convenience of description, the insulating member 300 is depicted as having a certain thickness; in actual practice, however, the insulating member 300 is extremely thin.

The hydrogen permeable substrate 20 is formed by means of locating the insulating member 300 between the stainless steel plate 200 and the combined member composed of the hydrogen permeable metal 10 embedded in the through-holes 110 of the copper plate 100, stacking the members and joining them together by means of a cladding process.

The cladding process is a method of joining thin plates of different material by superposing and rolling them. In the embodiment, those faces of the copper plate 100, the stainless steel plate 200 and the insulating member 300 that are to be joined to other members are irradiated with argon ions to exfoliate any oxide film on the joining face and activate the faces, and the faces are then joined by rolling using a cladding process. Since the insulating member 300 is not metal, two faces of the insulating member 300 may be provided with metal layers 301 of nickel or the like, and the metal layers 301 irradiated with argon ions to activate the joining faces. The process of argon ion irradiation to activation of the joining faces is carried out under a vacuum. By implementing the cladding process in this way, joining may be carried out at low temperature and low pressure. Additionally, by carrying out a surface activation process of the joining faces by means of irradiation with argon ions, joining may be carried out without producing an alloy layer. A hydrogen permeable substrate 20 joined in this way is depicted in FIG. 2.

Figure 2:
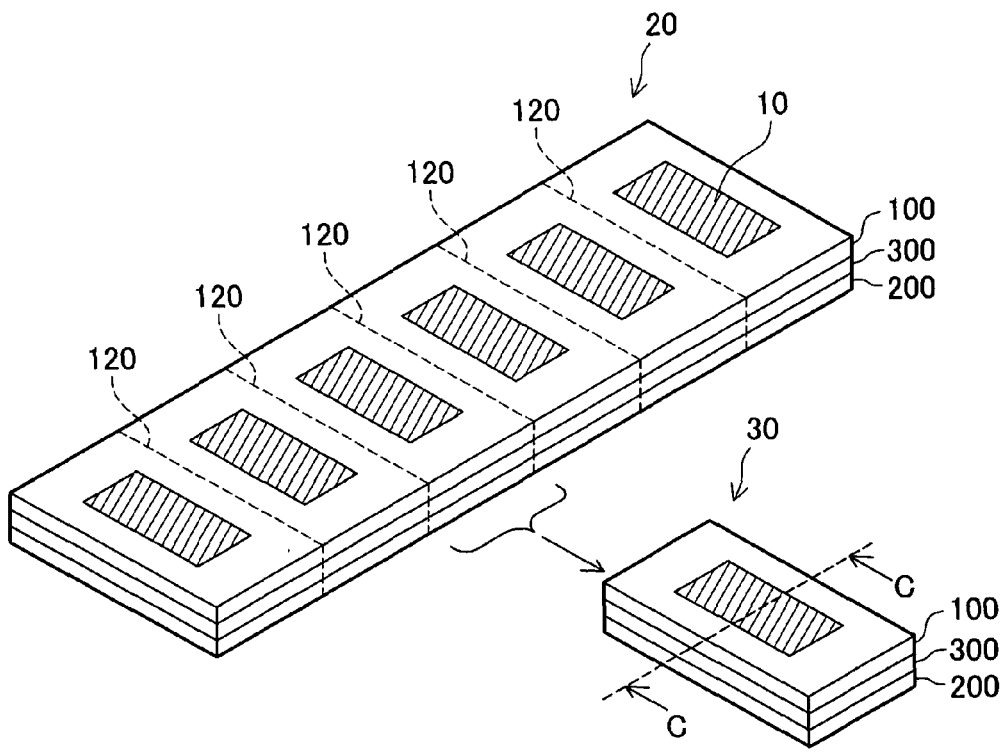
FIG. 2 is a perspective view depicting the hydrogen permeable substrate in embodiment.
Figure 3:
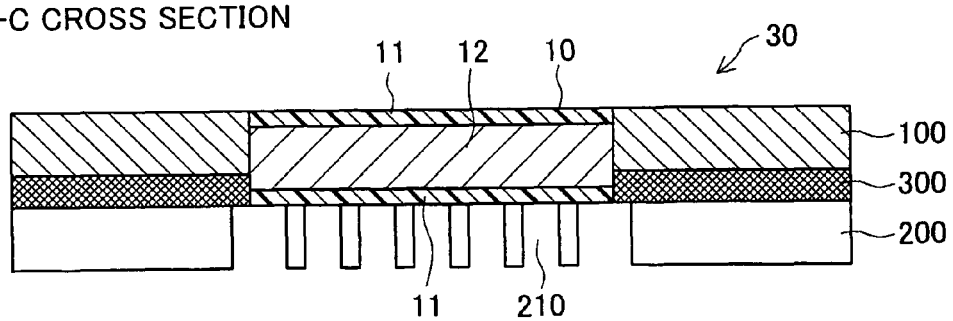
FIG. 3 is a sectional view of the hydrogen separation member in embodiment.

FIG. 2 is a perspective view depicting the hydrogen permeable substrate 20 in the embodiment. The hydrogen permeable substrate 20 is formed by joining, by means of the cladding process, the hydrogen permeable metal 10, the copper plate 100, the stainless steel plate 200, and the insulating member 300. In the embodiment, the hydrogen permeable substrate 20 is formed so as to have six hydrogen permeable metal 10s. The hydrogen permeable substrate 20 is cut along cut lines 120 so that each section contains one hydrogen permeable metal 10, to form hydrogen separation members 30. In FIG. 3 a hydrogen separation member 30 is shown in cross section taken along line B-B.

FIG. 3 is a sectional view of a hydrogen separation member 30 in the embodiment. In the hydrogen separation member 30, the copper plate 100 is joined with the insulating member 300, and the insulating member 300 is joined with the stainless steel plate 200. The hydrogen separation member 30 is formed by embedding the hydrogen permeable metal 10 in the through-hole 110 in the copper plate 100 and the through-hole 310 in the insulating member 300, and then joining this to the stainless steel plate 200. A plurality of holes 210 are formed at locations corresponding to the through-hole 110, in order to provide a smooth supply of hydrogen-containing gas. As hydrogen-containing gases it is possible to use, for example, hydrogen-rich reformed gases produced by reforming hydrocarbon fuels of various kinds such as gasoline, methanol, or natural gas. The hydrogen permeable substrate 30 is supplied with hydrogen-containing gases via the holes 210, hydrogen permeable substrate 30 separates the hydrogen due to the characteristics of the hydrogen permeable metal 10.

Figure 4:
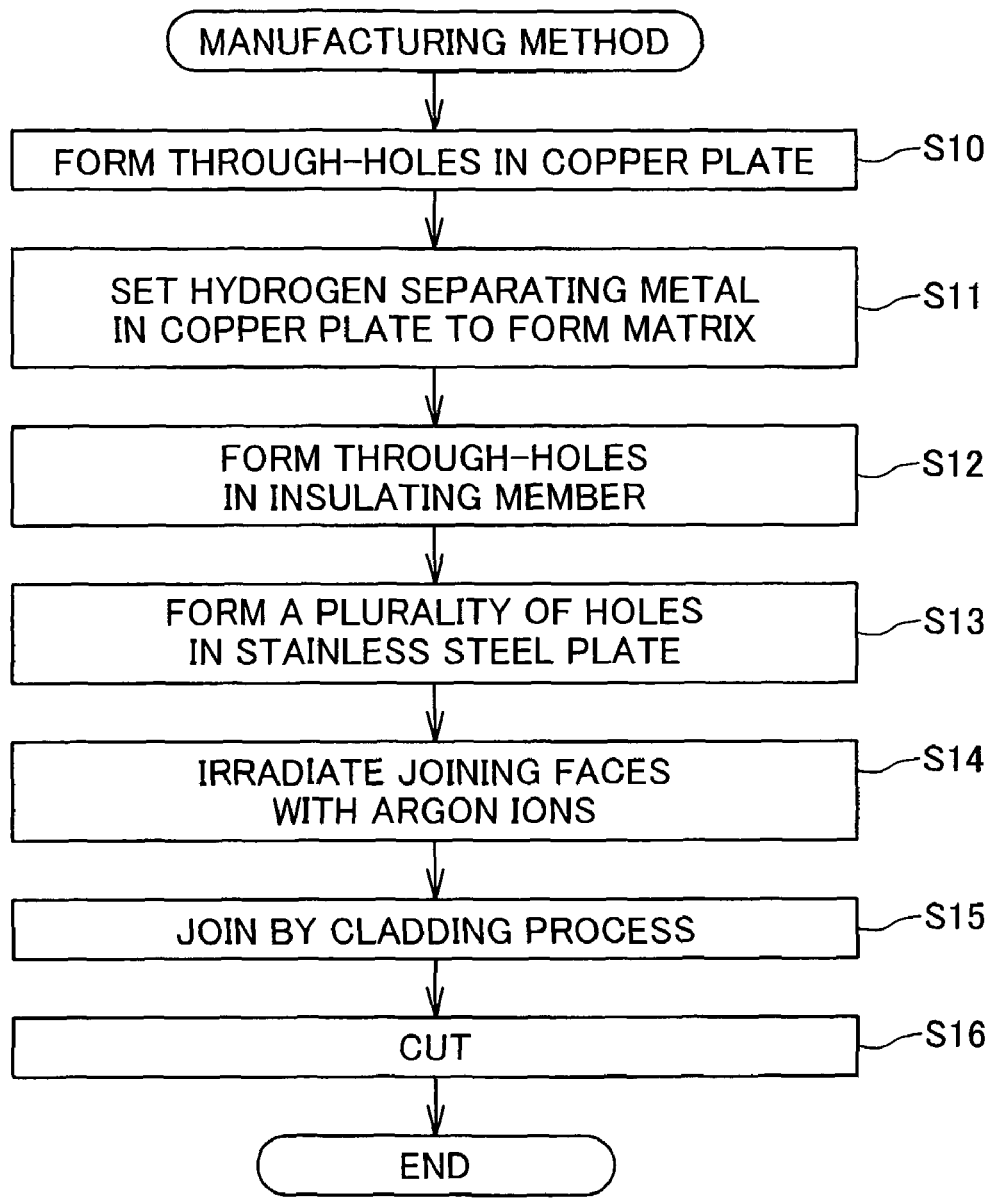
FIG. 4 is a process diagram illustrating the method for manufacturing the hydrogen permeable substrate in embodiment.

A2. Manufacturing Method:

FIG. 4 is a process diagram illustrating the method for manufacturing the hydrogen permeable substrate 30 in the embodiment. Through-holes 110 are formed in the copper plate 100 (Step S10). Hydrogen permeable metal 10 is embedded in the through-holes 110, to form a combined member (Step S11).

Through-holes 310 are formed in the insulating member 300 (Step S12), and a plurality of holes 210 are formed in the stainless steel plate 200, at locations corresponding to the through-holes 110 (Step S13).

Where the insulating member 300 is located between the copper plate 100 and the stainless steel plate 200, the joining faces thereof for joining to the other members are subjected to irradiation with argon ions to remove the oxide film from the surfaces (Step S14). The process is depicted in pattern diagrams in FIG. 5.

Figure 5A:
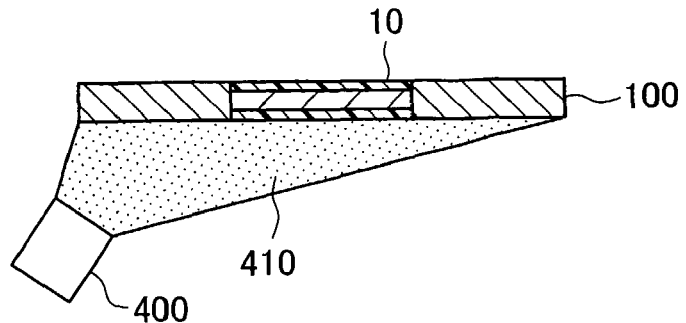
FIGS. 5A, 5B and 5C are views showing a frame format of depicting the process of irradiation with argon ions in embodiment.
Figure 5B:
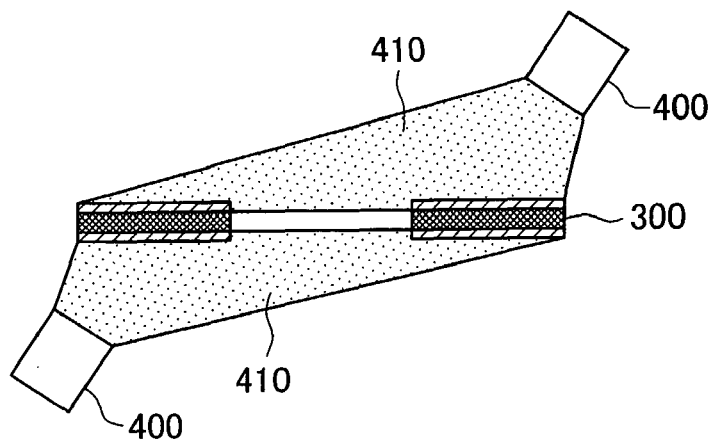
Figure 5C:
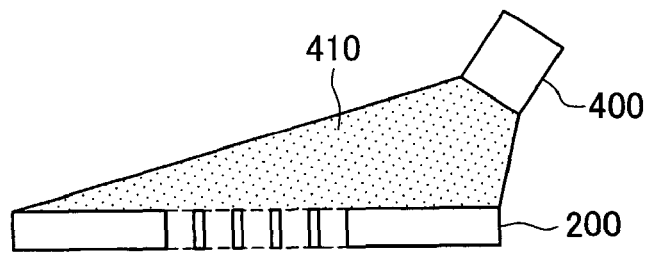

FIGS. 5A, 5B, and 5C are views showing a frame format of depicting the process of irradiation with argon ions in the embodiment. FIG. 5A is an exemplary depiction of irradiation of the copper plate 100 with argon ions. As shown in the drawing, the joining face of the copper plate 100 for joining to the insulating member 300 is irradiated with argon ions 410 by means of an irradiation machine 400. Similarly, FIG. 5B is an exemplary depiction of irradiation of the insulating member 300 with argon ions. As shown in the drawing, the joining faces for joining to the copper plate 100 and the stainless steel plate 200, i.e. the nickel metal layers, of the insulating member 300 are irradiated with argon ions 410 by means of the irradiation machine 400. FIG. 5C is an exemplary depiction of irradiation of the stainless steel plate 200 with argon ions. As shown in the drawing, the joining face of the stainless steel plate 200 for joining to the insulating member 300 is irradiated with argon ions 410 by means of the irradiation machine 400.

The copper plate 100, the stainless steel plate 200, and the insulating member 300 are irradiated with the argon ion, and these are stacked and joined by a cladding process (Step S15). The process is depicted in pattern diagrams in FIG. 6.

Figure 6:
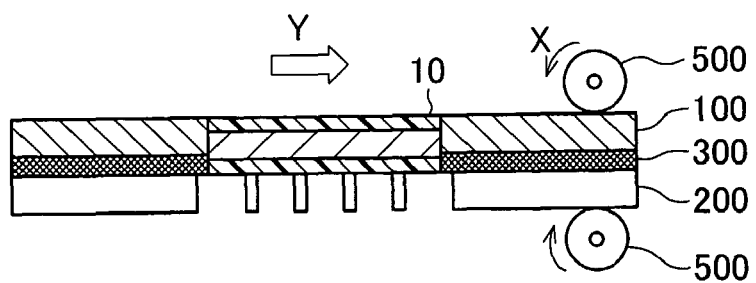
FIG. 6 is a diagram depicting joining by means of the cladding process in embodiment.

FIG. 6 is a diagram depicting joining by means of the cladding process in the embodiment. As shown in the drawing, the stainless steel plate 200, the insulating member 300, and the stainless steel plate 200 are stacked and rolled by being passed between a pair of rollers 500. The rollers 500 rotate the directions indicated by the arrow X, and the hydrogen permeable substrate 30 moves in the direction indicated by arrow Y. When the joining faces that have been activated by means of argon ions are joined by means of rolling, since joining may be carried out at low temperature, diffusion among the different metals does not readily occur, so joining may be carried out without formation of alloys due to metal bonding. Accordingly, an additional advantage is that a drop in hydrogen permeability may be suppressed.

The hydrogen permeable substrate 20 joined by means of the cladding process is cut along cut lines 120 so that a plurality of the hydrogen permeable metal 10 are individually separated (Step S16). By means of the above process, hydrogen permeable substrates 30 are manufactured.

According to the hydrogen permeable substrate 30 manufacturing method of the above embodiment, by means of fabricating a frame having through-holes formed in a copper plate, embedding hydrogen permeable metal in the frame to produce a combined member, and superposing this combined member onto a stainless steel plate, the hydrogen permeable substrate may be manufactured using a cladding process. That is, the hydrogen permeable substrate may be manufactured at low temperature and low pressure, and warping of the hydrogen permeable substrate due to heat may be restrained. Accordingly, change in composition of the hydrogen permeable metal due to warping may be restrained, and drop in capabilities of the hydrogen permeable substrate lessened. Additionally, deformation of the hydrogen permeable metal and the substrate joined with the hydrogen permeable metal may be prevented, so that diminished assembly performance may be restrained. Additionally, by carrying out a surface activation process of the joining faces by means of irradiation with argon ions to remove the oxide film, joining may be carried out without producing an alloy layer in the joined regions, so that a drop in hydrogen permeability may be suppressed.

According to the embodiment, a plurality of hydrogen permeable substrates may be manufactured with a single rolling operation, so that manufacturing efficiency may be improved.

Also, according to the embodiment, by locating an insulating member between the copper plate and the stainless steel plate, electrical continuity between the copper plate and the stainless steel plate may be eliminated. Accordingly, the hydrogen permeable substrate may be used favorably as the electrode on the anode side of a fuel cell.

In addition, according to the embodiment, since hydrogen permeable metal may be disposed only in those areas where the hydrogen separation reaction is to take place, cost performance may be improved.

B. Variant Embodiment

While the invention has been described hereinabove through a certain preferred embodiment, the invention is not limited to the embodiment, with various alternative arrangements being possible without departing from the scope thereof. The following arrangements are possible, for example.

(1) In the above embodiment, an insulating member 300 is located between the copper plate 100 and the stainless steel plate 200, but where, for example, the hydrogen permeable substrate of the invention is to be used in a hydrogen separation unit, an insulating member 300 need not be located.

(2) In the above embodiment, a plurality of holes 210 are formed in the stainless steel plate 200, but the arrangement is not limited to this. Provided that the component equivalent to the stainless steel plate 200 is a hydrogen permeable component, there is no need to form hole. However, even where a component is not hydrogen permeable, it is preferable to form hole, since the component provides smooth supply of hydrogen containing gases to the hydrogen permeable metal 10.

Figure 7:
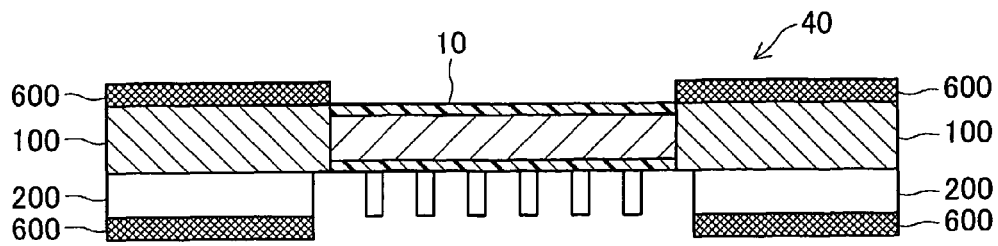
FIG. 7 is a sectional view of an arrangement of the hydrogen permeable substrate in a variant embodiment.

(3) FIG. 7 is a sectional view of an arrangement of a hydrogen permeable substrate 40 in a variant embodiment. The hydrogen permeable substrate 40 comprises hydrogen permeable metal 10, a copper plate 100, and stainless steel plate 200 joined by means of the cladding process described in the above embodiment, and is coated on surfaces of the hydrogen permeable substrate 40 with an insulating coat material 600. The coat material 600 may be, for example, organic silicone rubber; a glass coat. It is merely necessary that the material be an insulator.

The timing for coating of the coat material 600 may be, for example, after Step S15, or after cutting in Step S16 of FIG. 4. Alternatively, the copper plate 100 and the stainless steel plate 200 may have the coat material 600 coated to them in advance.

By adopting such an arrangement, gas-tightness may be improved during stacking of the hydrogen permeable substrate 40 and during joining to other substrates. By coating coat material having an insulating function to the surfaces of the hydrogen permeable substrate 40, the substrate may be used as the electrode on the anode side of a fuel cell.

Figure 8A:
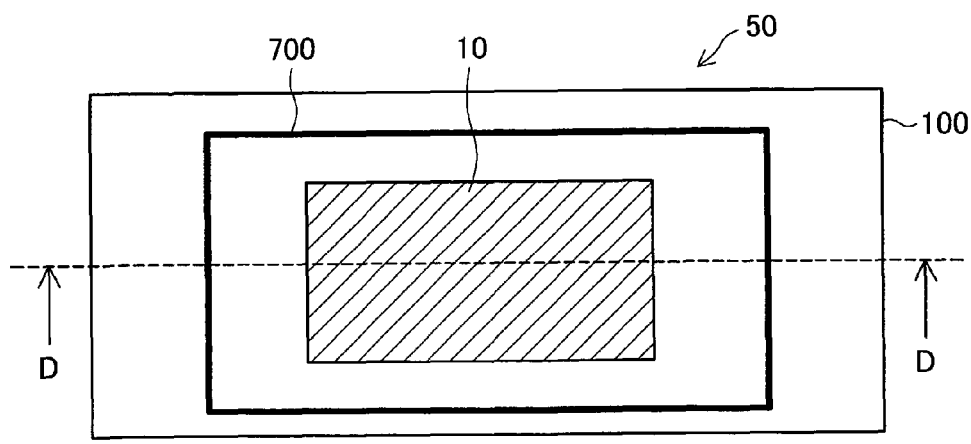
FIG. 8A is a diagram depicting the arrangement of a hydrogen permeable substrate in a variant embodiment.

(4) FIG. 8A is a diagram depicting the arrangement of a hydrogen permeable substrate 50 in a variant embodiment. FIG. 8A shows the hydrogen permeable substrate 50 in plan view from the copper plate 100 side. A bead 700 is formed around the perimeter of the hydrogen permeable metal 10 in the hydrogen permeable substrate 50. A sectional view cut along line D-D is shown in FIG. 8B.

Figure 8B:
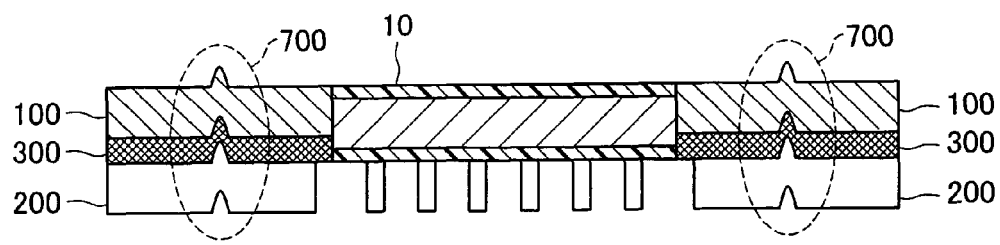
FIG. 8B is a sectional view of an arrangement of the hydrogen permeable substrate in a variant embodiment.

FIG. 8B is a sectional view of the hydrogen permeable substrate 50 cut along line C-C. The hydrogen permeable substrate 50 comprises an insulating member 300 located between a stainless steel plate 200 and a combined member of a copper plate 100 having hydrogen permeable metal 10 embedded therein, these being joined by the cladding process described in the above embodiment. As indicated by the broken line circles in the drawing, a convex bead 700 is formed on the hydrogen permeable substrate 50.

By adopting such an arrangement, gas-tightness may be improved during stacking of the hydrogen permeable substrate 50 and during joining to other substrates. By disposing a coat material having an insulating function between the copper plate 100 and the stainless steel plate 200, the substrate may be used as the electrode on the anode side of a fuel cell.

Figure 9A:
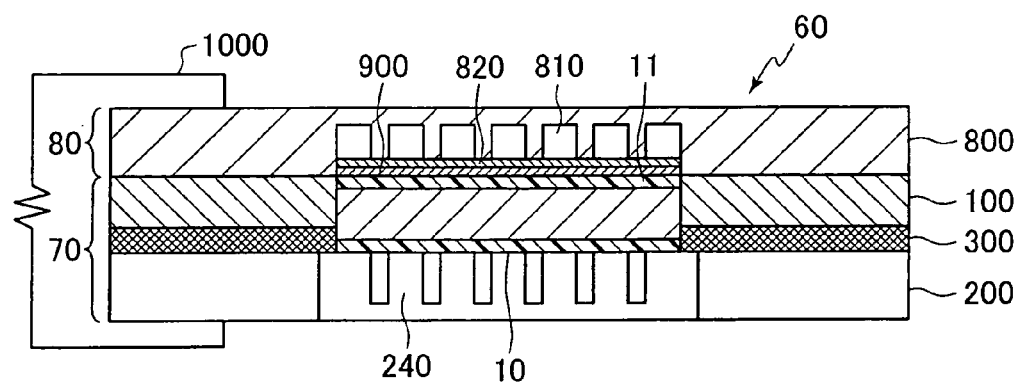
FIG. 9A is a diagram of a simplified arrangement of the fuel cell in a variant embodiment.

(5) FIG. 9A is a diagram of a simplified arrangement of a fuel cell 60 in a variant embodiment. The fuel cell 60 is supplied with air and hydrogen-contained gas and generates electricity. The fuel cell 60 has an anode 70, a cathode 80, and a proton conductive electrolyte 900 located between the anode 70 and the cathode 80.

The cathode 80 has a porous electrode 820 located adjacent to the electrolyte 900, and a separator 800. As shown in the drawing, plural grooves are formed in the separator 800 as flow channels 810 for supplying air to the electrode 820 side.

Figure 9B:
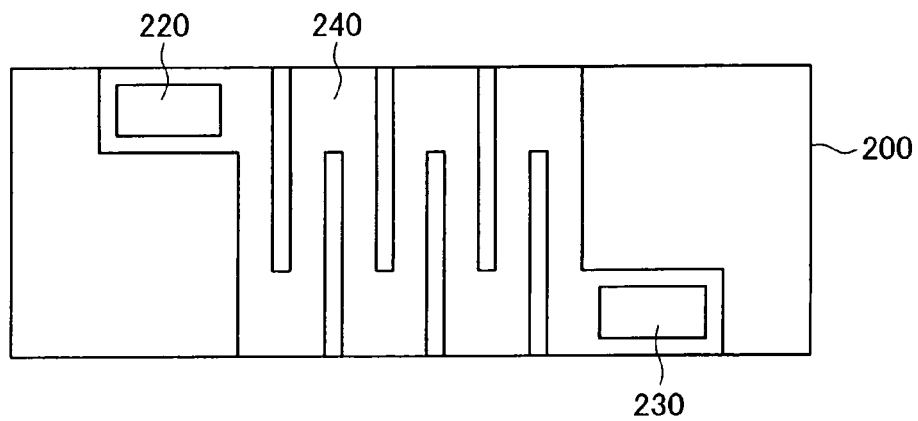
FIG. 9B is a diagram of the arrangement of the stainless steel plate 200 in a variant embodiment.

The anode 70 has a copper plate 100, a stainless steel plate 200, and an insulating member 300, joined by the cladding process described in the above embodiment. The anode 70 and the cathode 80 are insulated by means of the insulating member 300. By forming the insulating member 300 as part of the hydrogen permeable substrate as in this variant embodiment, the insulating member 300 may be joined by means of a cladding process, and thus may be positioned easily. FIG. 9B explains the structure of the stainless steel plate 200.

FIG. 9B is a diagram of the arrangement of the stainless steel plate 200 in the variant embodiment. FIG. 9B shows the stainless steel plate 200 viewed from the hydrogen permeable metal 10. The stainless steel plate 200 comprised a hydrogen containing gas inlet port 220, a hydrogen containing gas outlet port 230, and a flow channel 240. The hydrogen containing gas inlet port 220 and the hydrogen containing gas outlet port 230 are formed perforating through the stainless steel plate 200. The hydrogen containing gas inlet port 220, hydrogen containing gas outlet port 230, and flow channel 240 are formed by etching.

Following is a brief description of the principle of electricity generation by the fuel cell 60. First, when hydrogen containing gas is supplied to the flow channel 240 from the hydrogen containing gas outlet port 230, the hydrogen contained in the hydrogen containing gas is dissociated into protons and electrons by the hydrogen permeable metal 10. Dissociated protons pass through the hydrogen permeable metal 10 and migrate to the cathode 80 by means of conduction through the electrolyte 900. Dissociated electrons, on the other hand, are supplied to a predetermined electrical circuit 1000 connected between the anode 70 and the cathode 80, and then migrate to the cathode 80. In the flow channel 810, oxygen present in the supplied air, protons conducted through the electrolyte 900 to reach the electrode 820, and electrons reaching the separator 800 via the electrical circuit 1000 react and form water. The fuel cell 60 generates electricity on this principle.

By means of employing such an arrangement, the stainless steel plate 200 may be formed to serve as a flow channel plate, and the fuel cell may be made more compact.

The invention claimed is:

1. A method of manufacturing a hydrogen permeable substrate comprising:
 forming a through-hole in a first substrate;
 forming a combined member by embedding a hydrogen permeable metal in the through-hole of the first substrate;
 forming multiple tiny holes only at a portion of a second substrate corresponding to the through-hole of the first substrate, wherein each tiny hole of the second substrate is smaller than the through-hole of the first substrate;
 locating an insulating layer between the combined member and the second substrate, the insulating layer having a metal layer disposed on both sides of an insulating material and having an opening corresponding to the through-hole of the first substrate, the opening being the same size as the through-hole of the first substrate; and
 joining the combined member with the second substrate with the insulating layer therebetween by means of a cladding process.

2. The method according to claim 1 further comprising:
 prior to the joining, activating the joining faces of the combined member and the second substrate by a surface activation process.

3. The method according to claim 2, wherein the surface activation process includes a process of irradiating with argon ions.

4. The method according to claim 1, further comprising:
 a plurality of the through-holes are formed in the first substrate;
 the forming the combined member is implemented by embedding hydrogen permeable metal in each of the plurality of the through-holes; and
 the method further comprising:
  subsequent to the joining, cutting the hydrogen permeable substrate so that the hydrogen permeable metal is separated into individual pieces.

5. The method according to claim 1 further comprising:
 locating an insulating material on the surface of the hydrogen permeable substrate.

6. The method according to claim 1 further comprising:
 subsequent to the joining, forming convex shape to the perimeter of the hydrogen permeable metal of the joined hydrogen permeable substrate.

7. The method according to claim 1 further comprising:
 forming a flow channel for channel of reactant gas on the second substrate, wherein the reactant gas is used for the hydrogen separation effect in the hydrogen permeable substrate.

* * * * *